Aug. 4, 1964   J. E. GUTRIDGE ETAL   3,143,083
FIFTH WHEEL STAND
Filed June 15, 1960   7 Sheets-Sheet 3
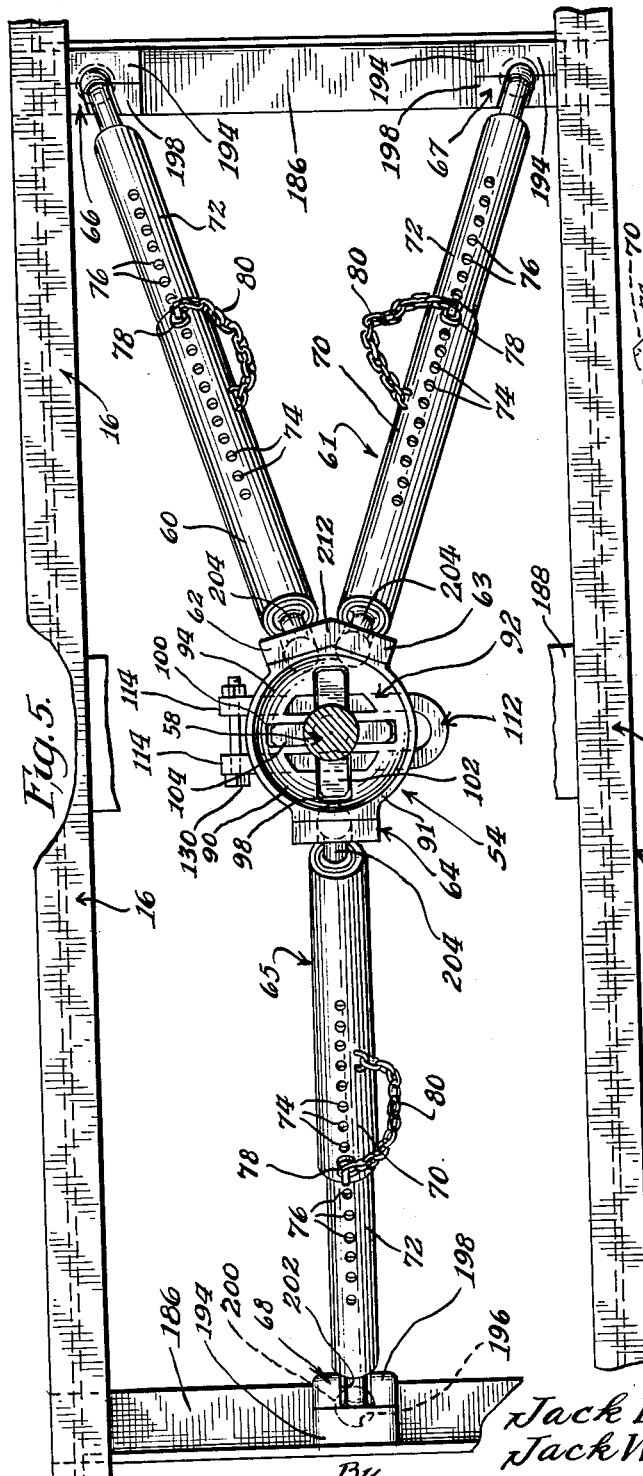
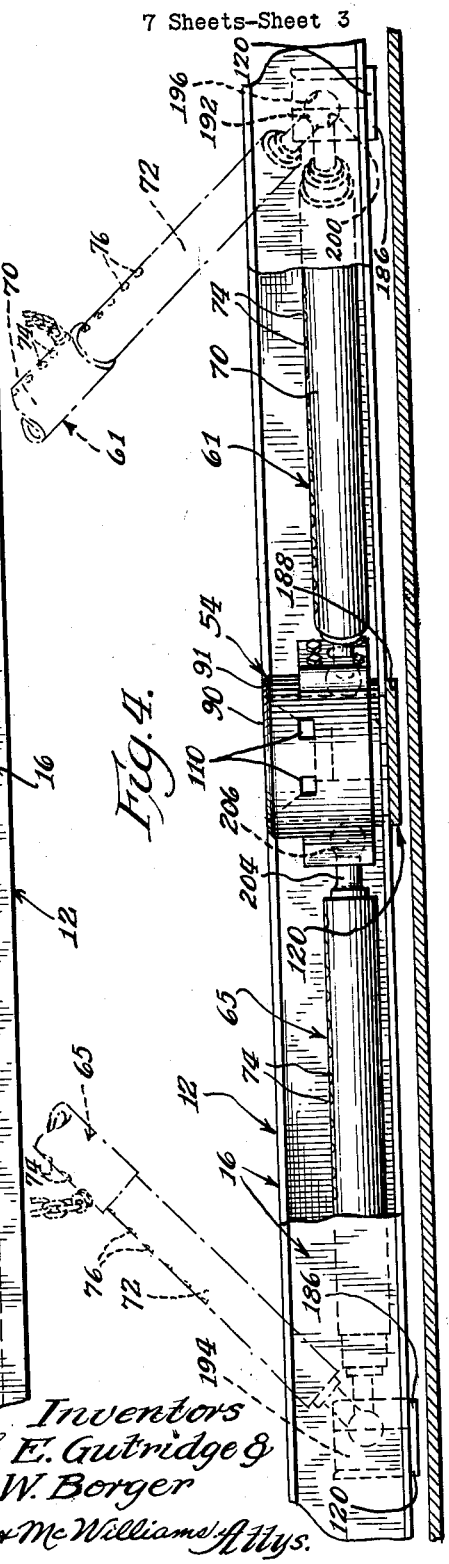
Inventors
Jack E. Gutridge &
Jack W. Borger
By Mann, Brown & McWilliams Attys.

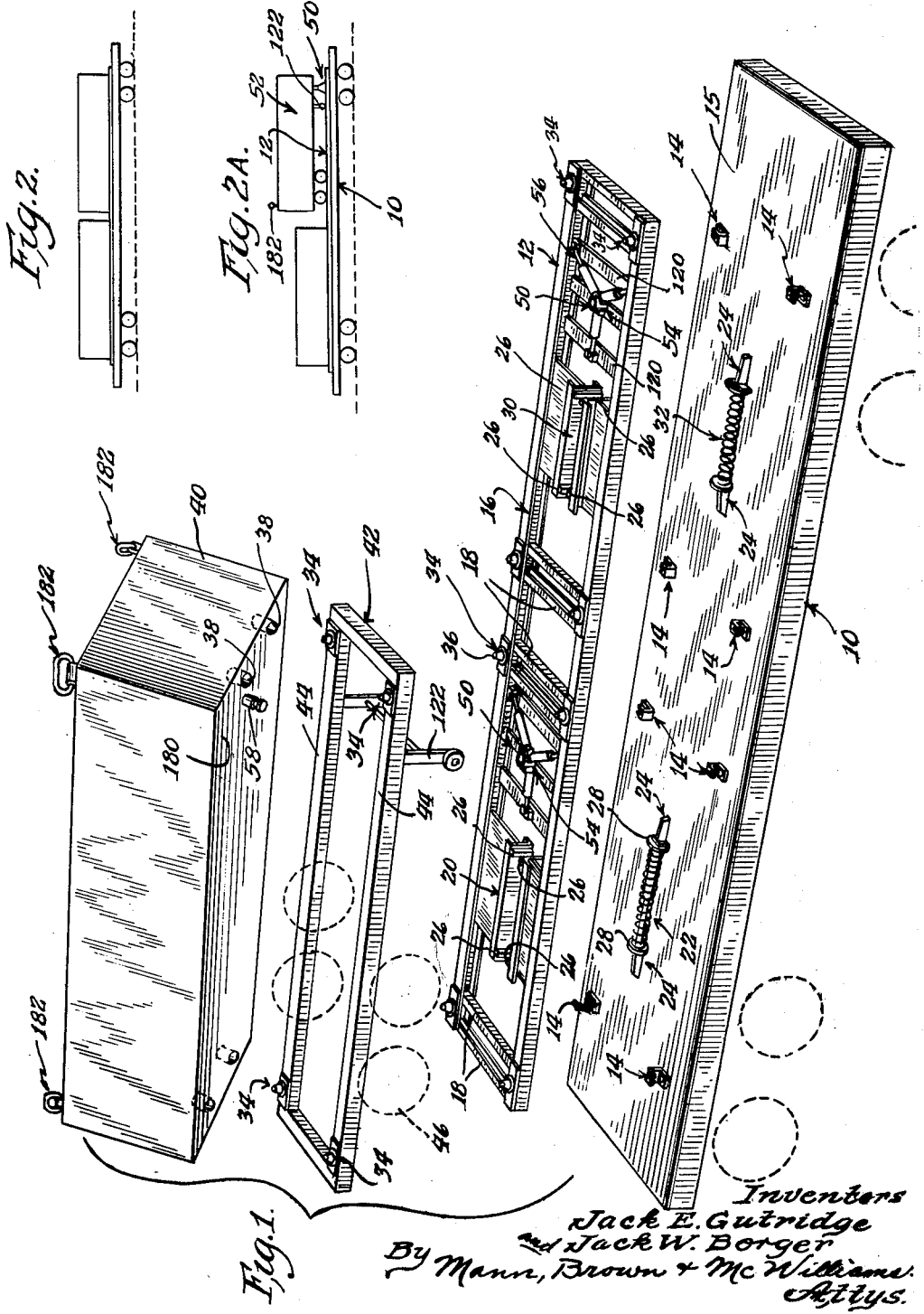

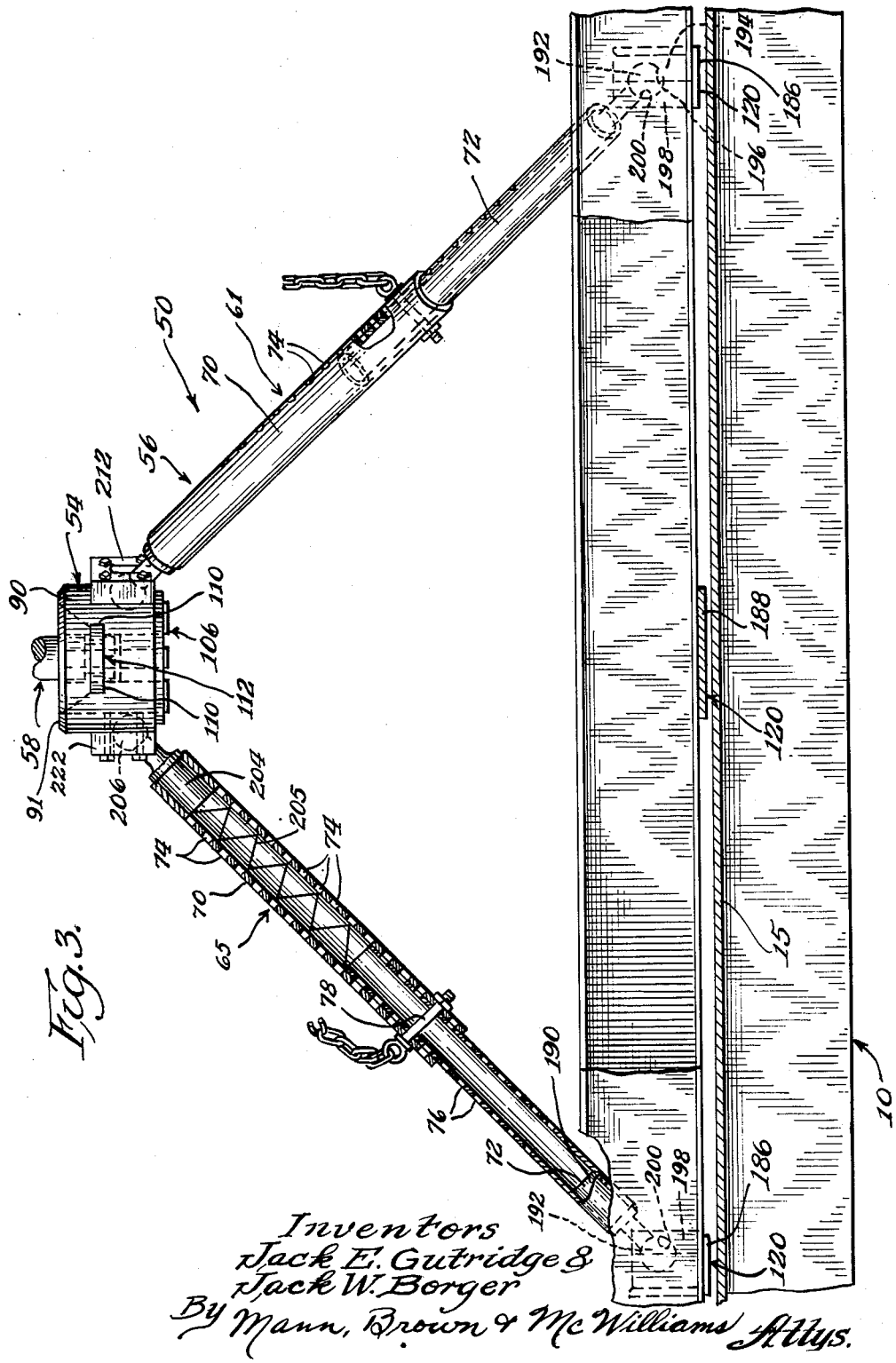

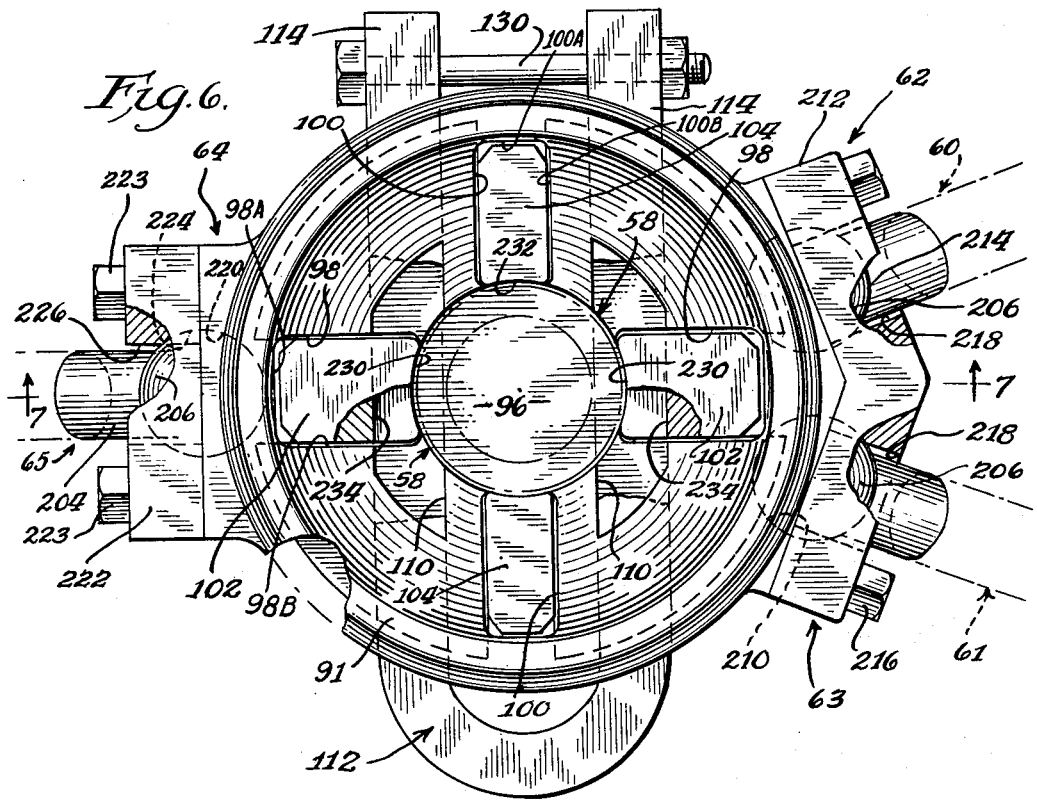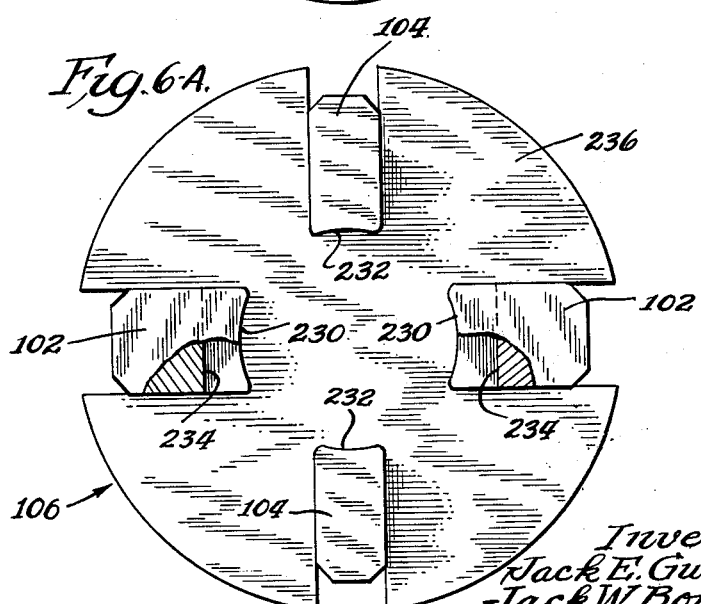

Aug. 4, 1964  J. E. GUTRIDGE ETAL  3,143,083
FIFTH WHEEL STAND
Filed June 15, 1960  7 Sheets-Sheet 5

Inventors
Jack E. Gutridge &
Jack W. Borger.
By Mann, Brown & McWilliams
Attys.

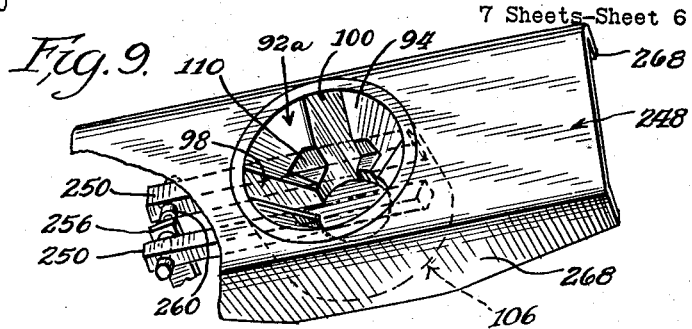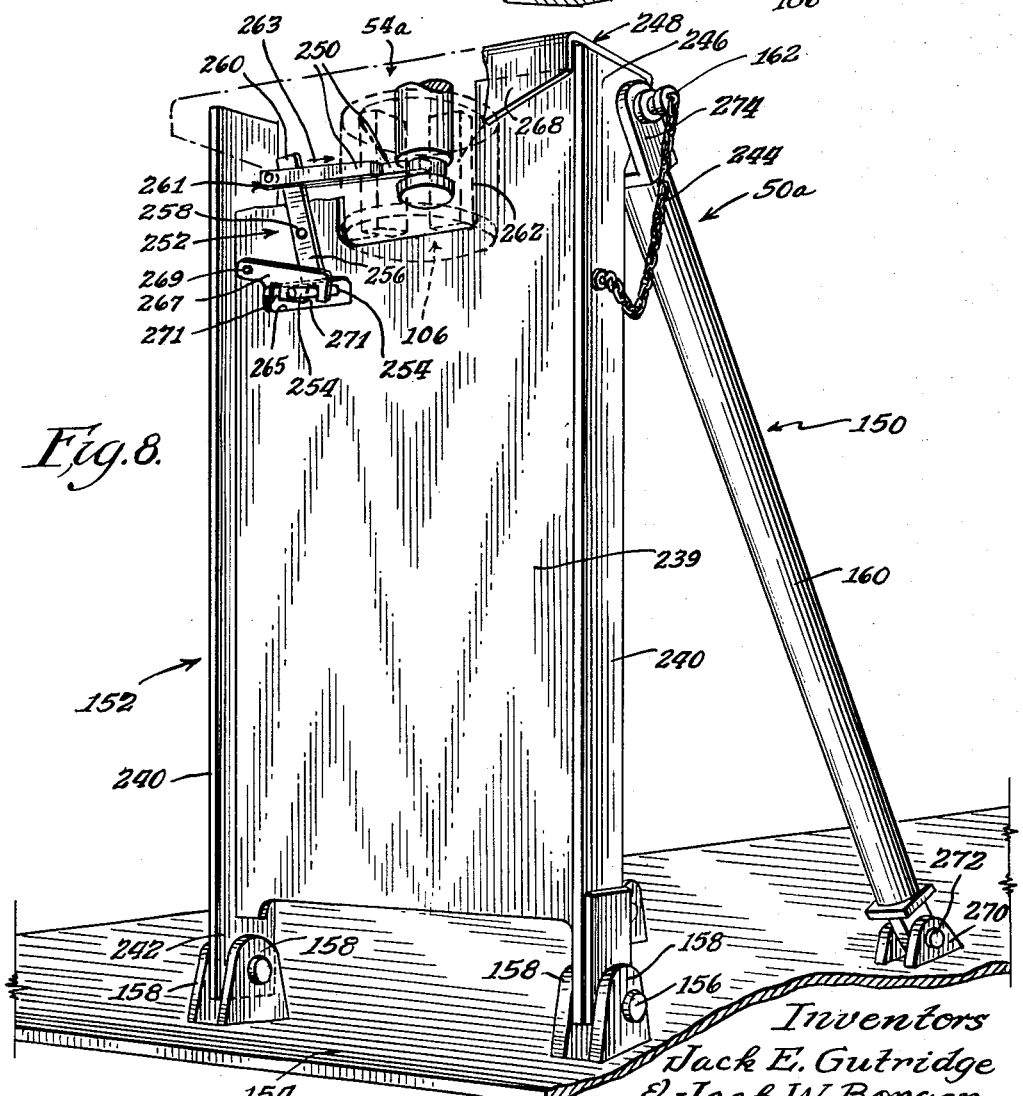

Aug. 4, 1964    J. E. GUTRIDGE ETAL    3,143,083
FIFTH WHEEL STAND
Filed June 15, 1960    7 Sheets-Sheet 7
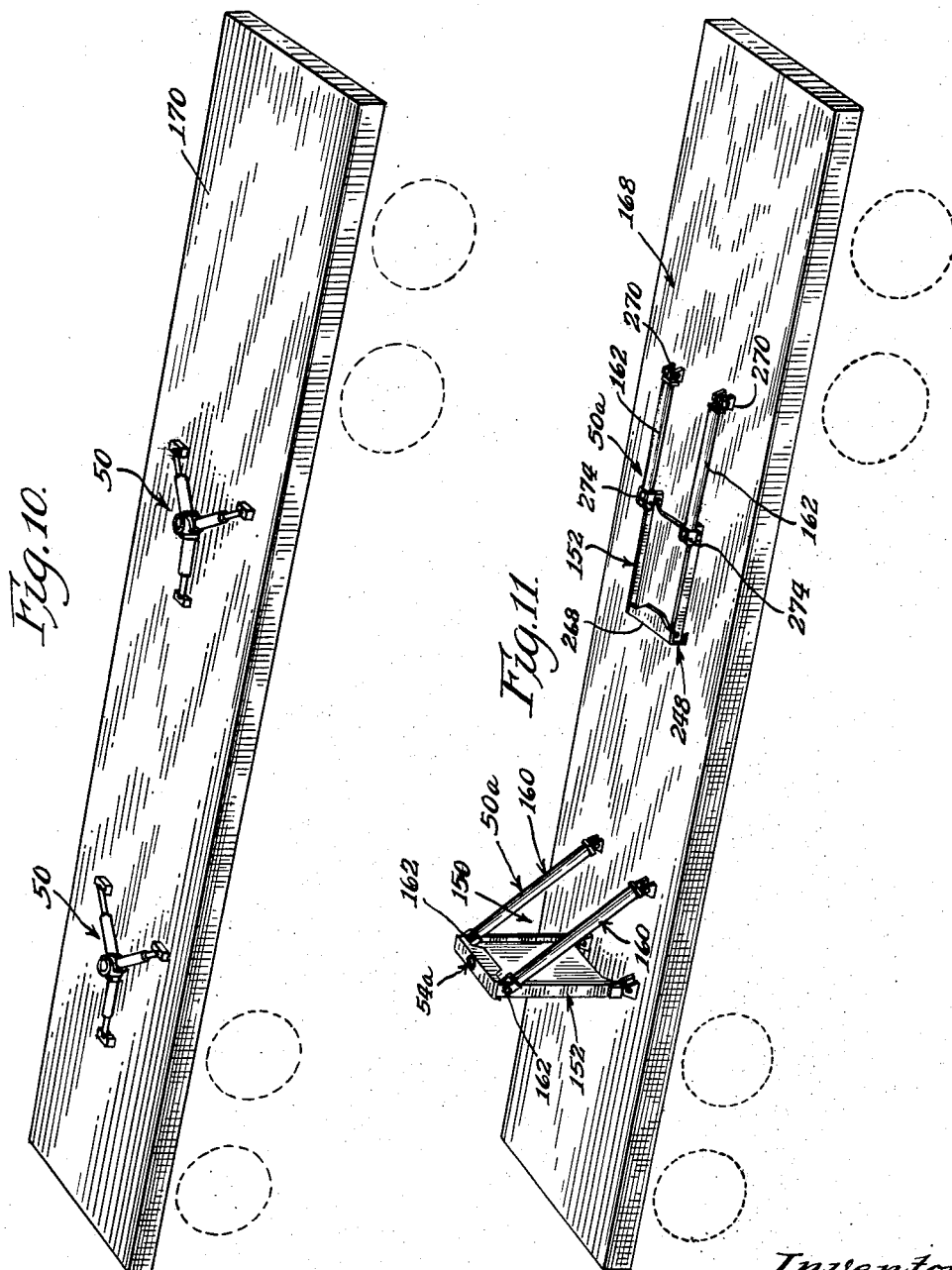
Inventors
Jack E. Gutridge &
Jack W. Borger
By Mann, Brown & McWilliams,
Attys.

United States Patent Office 3,143,083
Patented Aug. 4, 1964

3,143,083
FIFTH WHEEL STAND
Jack E. Gutridge, Dyer, Ind., and Jack W. Borger, Calumet City, Ill., assignors to Pullman Incorporated, Chicago, Ill., a corporation of Delaware
Filed June 15, 1960, Ser. No. 36,310
3 Claims. (Cl. 105—368)

Our invention relates to a fifth wheel stand for securing trailers to railroad cars and more particularly, to a device for use in the piggyback system of freight handling for the purpose of latching the trailer to the car.

The piggyback system of freight handling contemplates the transportation of freight in trailers which are carried on flatcars a major portion of the distance between shipping points and destinations. The trailers are customarily secured to the car by what is known as a fifth wheel stand, which normally includes a trailer kingpin latching device supported by struts which usually are arranged to move the latching device from an inoperative retracted position on the bed of the car to an operative elevated position in which the latch device engages the trailer kingpin.

Customarily, the latch device of the stand has a fixed path of movement between its inoperative and operative positions, and the stand itself cannot be adjusted longitudinally or laterally of the car, which means that trailer spotting must be of sufficient accuracy so that the kingpin and trailer will be engaged and centered as the stand is raised to its operative position. Furthermore, the operative elevated position of conventional stands customarily is at a fixed distance above the car bed which does not take into consideration that trailer heights vary considerably. While some stands permit some variation in trailer height, the spotting tolerances change, either with respect to size or location longitudinally of the car.

Therefore, a principal object of this invention is to provide a fifth wheel stand that not only permits adjustment of the position of the kingpin latching device to accommodate a reasonable misplacement of the trailer from an accepted spotting tolerance, but also provides optional fifth wheel stand height.

Trailers, when used in piggyback service, may be positioned on the railroad car either by employing end or side loading procedures (which involves backing the trailer onto the car from one end thereof, or from one side thereof) or crane loading procedures, which involve bodily lifting the trailer onto the car. However, conventional fifth wheel stands customarily are designed for use with only one of these loading procedures, which necessarily limits the versatility of the loading and unloading yards.

A further principal object of our invention is to provide a fifth wheel stand that may be used with facility in connection with either of the aforementioned end or side loading procedures or with crane loading procedures.

Another difficulty with conventional fifth wheel stands is that they are so massive and heavy that some sort of power operated jack is required to move them between their elevated and lowered positions. These jack devices customarily contemplate the use of an electrically powered actuating unit, which can necessarily only be operated at yards having the required wiring installation. While some stands may be manually operable, as a practical matter it requires two men to provide the manpower necessary due to slow acting leverage systems needed to effect elevation of the stand because of the heavy mass of the structure to be lifted.

Still another important object of this invention is to provide a fifth wheel stand in which movement of the stand between elevated and retracted positions may be effected manually, and with facility, by a single operator without having to actuate a leverage system.

Other objects of the invention are to provide a fifth wheel stand having a simplified kingpin latching device, to provide a tripod type support structure for a fifth wheel stand latching device that permits adjustment of the latching device both laterally and longitudinally of the car, and to provide a fifth wheel stand that is economical of manufacture, convenient in use, and readily adapted for application to the various forms of conventional equipment customarily employed in the piggyback system of handling freight.

Further objects, uses and advantages will become obvious or be apparent from a consideration of the following detailed description and the application drawings.

In the drawings:

FIGURE 1 is a diagrammatic exploded perspective view illustrating our invention as it may be applied to a standard railroad flatcar in connection with a long travel cushion container supporting carriage or rack, showing also, largely in block diagram form, a type of container adapted to be associated with the rack, a trailer chassis adapted to carry the container for highway transit, and suitable latching devices for latching the container to both the chassis and the rack;

FIGURES 2 and 2A diagrammatically illustrate two alternate ways of loading the car of FIGURE 1 that are made possible by the fifth wheel stand of this invention;

FIGURE 3 is a side elevational view of one of the fifth wheel stands of our invention as attached to the rack of FIGURE 1, showing the stand in its elevated position, with the view being on an enlarged scale and with parts broken away;

FIGURE 4 is a view similar to that of FIGURE 3, but showing in full lines the stand in its retracted position;

FIGURE 5 is a plan view of the stand as shown in FIGURE 3;

FIGURE 6 is an enlarged plan view of the stand latching device as shown in FIGURE 5, parts being broken away;

FIGURE 6A is a plan view of the pronged locking device employed in association with the fifth wheel stand latching device of FIGURE 6, showing the locking device as it is disposed in the showing of FIGURE 6;

FIGURE 8 is a diagrammatic perspective view illustrating a different type of supporting structure for our kingpin latching device, adapted for connection directly to standard cars, some parts being shown in outline form only and the position of the kingpin when grasped by the latching device being indicated in full lines;

FIGURE 9 is a diagrammatic top perspective view of the top or fifth wheel plate structure of the stand of FIGURE 8, better depicting one component of this form of the kingpin latching device and illustrating a portion of another component thereof;

FIGURE 10 is a diagrammatic perspective view illustrating the fifth wheel stand of FIGURES 1-7 applied directly to a standard flatcar; and FIGURE 11 is similar to FIGURE 10 but illustrates the stand of FIGURES 8 and 9 as applied directly to a standard flatcar.

*General Description*

Figure 7:
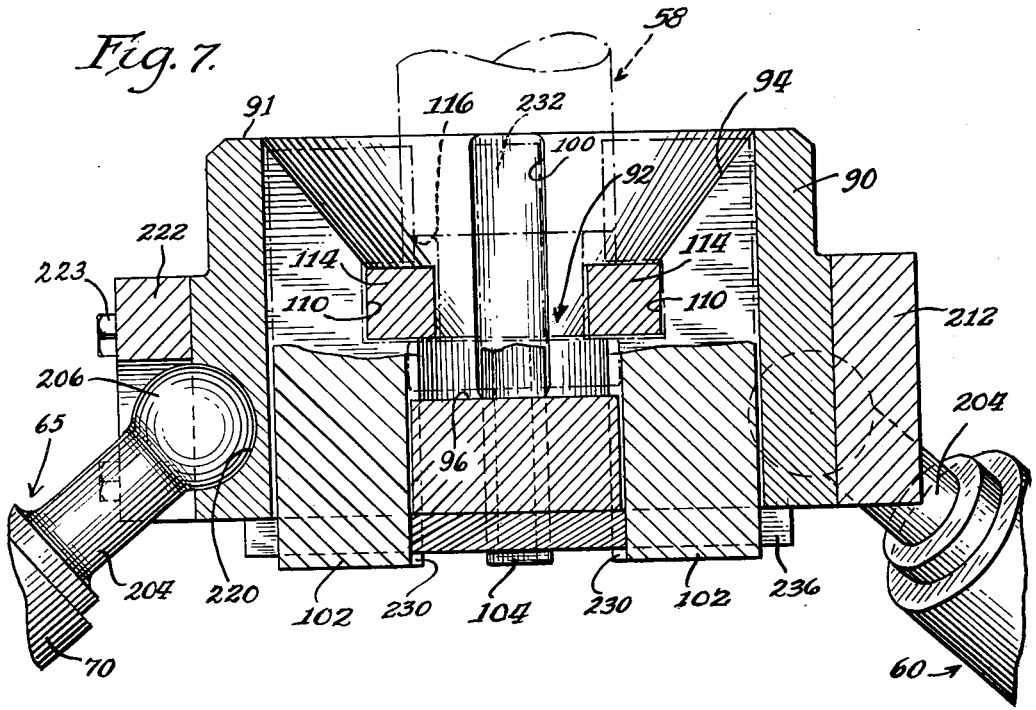
FIGURE 7 is a cross-sectional view along line 7—7 of FIGURE 6.

This invention is closely related to that disclosed in our concurrently filed application Serial No. 36,222 (the disclosure of which is hereby incorporated herein by this reference) which relates to a railroad car freight container support platform or rack arrangement cushioned against longitudinal impacts in accordance with the principles described in the copending application of William H. Peterson, Serial No. 856,963, filed December 3, 1959, now Patent 3,003,436, granted October 10, 1961 (the entire disclosure of which is hereby incorporated herein by this reference).

The invention of said Peterson application Serial No. 856,963 provides a new approach to the protection of lading in transit on railroad cars which solves the lading damage claim problems that have been greatly magnified in recent years by increased service speeds with the resulting increase in severity and frequency of coupler impacts between freight cars.

Said Peterson application explains that during impacts, changes in the absolute velocity of the lading, which are normally caused by stopping and starting of the car, and by impacts against the car couplers during transit, are effected by adding or subtracting kinetic energy to the lading through frictional forces acting between the lading and the car as well as the pressure of the car end wall on the lading (the car end wall involved depending on which car coupler is initially subjected to the longitudinal shock and whether the shock is in buff or in draft).

Said Peterson application discloses that damage free lading protection against longitudinal impacts (that is, impacts applied against the car couplers) can be obtained if there is interposed between the couplers and the car body containing the lading a cushioning device or arrangement having a cushioned travel sufficient in capacity and length that the absolute velocity of the lading is changed to that required by the Law of Conservation of Momentum for Inelastic Bodies by employing to a substantial degree the frictional forces acting between the lading and the car, as distinguished from the compressive forces applied to the lading by the car end wall. This novel approach is particularly applicable to resilient lading (goods packed in fibre boxes) and involves, among other things, extending the time of closure of the cushioning device employed sufficiently so that changes that must occur to the absolute velocity of the lading (by reason of the aforementioned Law of Conservation of Momentum) occur to the lading as a unit. The length of travel found essential for U.S. railroad practices is in the range of 20 to 40 inches, and preferably is on the order of 30 inches.

It has been found, as disclosed in said Peterson application, that a cushioned travel in this range permits the inherent stability of the load and the friction between the lading and the car body to act as substantial factors in creating the lading acceleration (either positive or negative) necessary to achieve the absolute velocity dictated by the aforementioned Law of Conservation of Momentum, without developing withing the lading the destructive compressive forces which cause lading damage.

Said Peterson application also discloses that when the Peterson invention is employed to protect lading, the car structure may be greatly simplified, as impact stresses acting on the car body and underframe are necessarily greatly reduced and that this applies to cars with freight container bodies employed in the practice of piggyback container systems of handling freight.

Said Peterson application discloses that the benefits of his invention may be employed in practicing container systems of handling freight by mounting on a standard flatcar a platform or carriage on whihc the freight container is supported, and interposing between the platform or carriage and the bed of the flatcar, a cushioning device of the character contemplated by the Peterson invention.

Our invention of said concurrently filed application Serial No. 36,222 relates to a specific embodiment of such an arrangement and the fifth wheel stand of this application is a specific embodiment of the simplified stands made possible by the Peterson invention.

Referring now to FIGURE 1, reference numeral 10 generally indicates a standard railroad flatcar having applied thereto one of the cushioned carriages or racks 12 disclosed in our said application Serial No. 36,222, which carriage or rack 12 is slidably mounted on spaced antifriction bracket assemblies 14 fixed to car deck 15 that serve the purpose of guiding the movement of the carriage or rack 12 when the impetus of coupler impacts are being dissipated and when carriage or rack 12 is being returned to its normal load carrying position.

The rack or carriage 12 comprises spaced side sills 16 joined together by suitable transversely extending members 18, and the rack or platform 12 includes a cushion pocket 20 that is adapted to receive a hydraulic cushion device 22 of the type described in the copending application of William H. Peterson, Serial No. 782,786, filed December 24, 1958, now Patent No. 3,035,827, granted May 22, 1962, the entire disclosure of which is hereby incorporated herein by this reference. The cushion device 22 is a dissipative energy system type constant force travel long travel cushioning mechanism arranged to transfer and dissipate substantially all kinetic energy imposed upon the flatcar by draft and buff forces applied to one of the car couplers (in excess of the minor amount absorbed by the draft gear and return springs of the device 22).

Device 22 is interposed between spaced stop members 24 affixed to the car and spaced lugs 26 carried by the rack or carriage 12 adjacent each end of the cushion pocket 20, and as disclosed in our application Serial No. 36,222, the cushion 22 includes follower members 28 that respectively bear against the respective sets of lugs and stops 24 and 26. The rack or carriage 12 illustrated also includes a spring pocket 30 in which a booster spring 32 is interposed between a second set of stop members 24 and lugs 26 for purposes of supplementing the return action of the hydraulic cushioning device 22.

The rack 12 in the form illustrated is provided with suitable latching devices for latching the container to the rack when the loading arrangement of FIGURE 2 is to be employed, which latching devices may include a familiar form of bracket structure 34 including a cone-shaped protuberance 36 that is adapted to be received in a recess 38 formed in the undersurface of a freight container 40 that is adapted to be mounted on rack 12.

Preferably the bracket structures 34 and the recesses 38 of the containers 40 are given a standard lateral and longitudinal spacing so that the containers may be interchangeably mounted either on the rack 12 or on the highway vehicle chassis generally indicated at 42 in FIGURE 1. Also, the bracket structures 34 are spaced apart laterally of the car 10 a distance corresponding to the normal spacing between the sill members 44 of the chassis, and the sill members 16 of rack 12 are given a similar spacing, as disclosed in the application of Jack E. Gutridge, Serial No. 21,331, filed April 11, 1960. In accordance with said Gutridge application, the spacing of chassis sill members 44 is limited by regulations dealing with the spacing between the chassis wheels 46, and this permits a trailer chassis 42 to be backed onto car 10 to position the chassis over rack 12, since the chassis wheels 46 will ride on either side of rack 16.

The fifth wheel stand of this invention is generally indicated in FIGURE 1 by reference numeral 50 and is provided for the purpose of securing a trailer, for instance, the trailer 52 of FIGURE 2A, to rack or carriage 12 when it is desired to have a loading arrangement of the type illustrated by FIGURE 2A.

Referring now to FIGURES 3-7, the stand 50 generally comprises a latching device 54 adapted to be supported by tripod type prop structure 56. The latch device 54 is arranged to be placed in engagement with the trailer kingpin 58, and in accordance with this invention, this may be done either before or after the prop structure 56 has been latched to its operative elevated position.

The prop structure 56 comprises three spaced telescoping strut assemblies 60, 61 and 65 (see FIGURE 5) which are connected to the latch device 54 by the ball and socket joint assemblies 62, 63 and 64 that are diagrammatically illustrated in the drawings, said strut assemblies being connected to the rack or carriage 12 by similar ball and socket joint assemblies 66, 67 and 68, respectively. The strut assemblies 60, 61 and 65 each comprise telescoping members 70 and 72 formed with appropriate openings 74 and 76, respectively, that are adapted to be aligned for receiving appropriate pins 78 to latch the strut assemblies in a desired position of extension as will be dictated by the desired height of the kingpin latch device 54. The respective pins 78 may be permanently affixed to the upper telescoping members 70 by appropriate chains 80.

The kingpin latching device 54 comprises a rounded fifth wheel body member 90 formed with an annular fifth wheel surface 91 and a closed perimeter kingpin seat or pocket 92 defined by the closed perimeter conical kingpin guide surface 94 and the planar abutment or floor surface 96 having their central axes substantially aligned, with said surfaces being arranged in circumambient relation about said axes. The body member 90 is formed with spaced openings or apertures 98, 98 and 100 that extend axially of the kingpin pocket 92 and through guide surface 94, which are adapted to receive the respective rigid locking prong members 102 and 104 of the pronged locking device 106 that is employed for purposes of establishing spaced abutment or compression stress connections between the kingpin and the latch device body member 90, over substantially the full depth of pocket 92, when the trailer kingpin is received in seat or pocket 92 (see FIGURE 7).

It is important to note that the prong members 102 and 104 are of sufficient length to extend vertically upwardly through substantially the full depth of pocket 92 (see FIGURE 7) and thus prong members 102 and 104 project upwardly to a position approximating the level of the body fifth wheel surface 91. It is imperative that these prong members 102 and 104 have lengths on this order, as compared to the depth of pocket or seat 92, since the loads that are to be transmitted to kingpin 58 must be applied in the form of shear stress, as distinguished from bending stress, and thus such loads must be applied to the kingpin 58 as close as possible to the juncture of the kingpin and the trailer undersurface 180; by giving prong members 102 and 104 the relative lengths indicated, their upper ends will be positioned approximately at the level of the juncture of the kingpin with the trailer undersurface, as will be clear from the showing of FIGURE 7, and in particular, that dealing with the close adjacency of the fifth wheel surface 91 to the upper ends of these prong members.

The body member 90 is also apertured crosswise of the axis of seat 92, as at 110, to receive U-shaped latch member 112 the latch member 112 provides spaced latching arms or elements 114, the relation between the apertures 110 and body member 90 is made such that the latching elements 114 are received within the conventional slot 116 (see FIGURE 7) of the kingpin when latch member 112 is applied to apertures 110 (after body 90 is in engagement with a kingpin 58 with fifth wheel surface 91 abutting against the undersurface of the trailer, in the manner customary with fifth wheel stands). It will be appreciated from the showing of FIGURE 7 that this effectively locks the trailer kingpin 58 to the kingpin latching device.

The stand 50 in its lowered inoperative position is shown in FIGURE 4 and as indicated, the strut assemblies 60, 61 and 65 are fully contracted and the latch device 54 rests on one of the cross members 120 fixed between sill members 16 of rack or carriage 12. Preferably, the latch device 54 is proportioned with respect to the depth of sill members 116 so that a container 40 may be applied over the stand 50 if, for instance, the container loading arrangement of FIGURE 2 is desired.

Assuming that it is desired to secure a trailer such as trailer 52 of FIGURE 2A to the car 10, stand 50 permits the trailer to be mounted in position either by backing same onto the car 10 from one end thereof, or by crane lifting the trailer into place.

Assuming that it is desired to back the trailer 52 onto the car in accordance with standard piggyback practice, the car 10 is positioned as is customary for such procedures so that the trailer can be backed on the car 10 from a suitable loading ramp at the end of the string of cars of which car 10 will form a part. The trailer 52 is backed until its kingpin is approximately positioned over the stand 50, after which the trailer is lowered onto its landing gear 122 and then disconnected from its tractor after which the tractor is removed. In accordance with our invention, the stand 50 permits an operator to manually lift the kingpin latching device 54 from the lowered retracted position of FIGURE 4 into operative engagement with kingpin 58 (for instance, the positioning of FIGURES 3 and 7), the ball and socket joint assemblies permitting limited adjustment laterally and longitudinally of the car as may be required to properly seat the kingpin within the latch device. When the latch device has been properly positioned in association with the kingpin 58, latch pins 78 are applied to the strut assemblies to hold the strut assemblies in the indicated position of extension. The strut member openings 74 and 76 are preferably spaced so that alignment of the openings of the respective members 70 and 72 will be achieved within a fraction of an inch.

We contemplate that the strut assemblies 60, 61 and 62 may include suitable springs or other arrangements for biasing them to their extended positions as may be required to reduce the manual effort necessary to lift the kingpin latch device 54 to its desired or necessary position of elevation. A suitable specific strut arrangement may be the vertical fifth wheel stand strut disclosed in FIGURE 15 of Sherrie et al. application Serial No. 797,989, filed March 9, 1959, the disclosure of which is hereby incorporated herein by this reference.

After the kingpin latching device 54 is positioned as shown in FIGURE 3, the pronged locking device 106 is applied to the openings or apertures 98 and 100 to effect the positioning indicated (partially in broken lines) in FIGURE 7. The pronged members 102 and 104 of device 106 tend to center the body 90 with respect to the kingpin and form spaced abutments or compression stress connections between the body 90 and the kingpin 58, as will be apparent from a consideration of FIGURES 5 and 7. In other words, when prong member 102 and 104 are positioned as shown in FIGURE 7, their inner surfaces 230 and 232 (see FIGURE 6) respectively are positioned for substantial abutting relation with the kingpin 58, and substantially along the entire length of the kingpin that projects from the trailer undersurface, and since prong member receiving openings 98 and 100 of body 90 have prong member contacting or abutment surfaces 98A, 98B and 100A, 100B that extend most of the depth of the body 90 (see FIGURE 7) up to the fifth wheel surface 91, prong members 102 and 104 act in compression in transmitting thrusts between kingpin 58 and body 90.

The latch member 112 may then be applied to apertures 110 and suitable bolt 130 applied thereto to complete the latching of the trailer to rack or carriage 12.

The landing gear of the trailer is then retracted to rest the forward end of the trailer on stand 50, and this permits the long travel cushioning arrangement of FIGURE 1 to protect the lading of the trailer 52 when coupler impacts are occasioned, in accordance with the teachings of our application Serial No. 36,222.

The trailer is disconnected from the stand 56 by substantially reversing the locking procedure above outlined.

In the event that the trailer 52 is to be crane loaded onto car 10, the stand 50 is initially raised to its elevated position to approximately the height required to support the front end of the trailer above the bed of car 10 without it resting on its landing gear. A suitable crane is then employed to lift the trailer 52, from a loading point alongside the car 10, to a position above car 10 with the trailer kingpin more or less aligned with latching device 54. The trailer is then lowered to bring the kingpin 58 into engagement with the conical guide surface 94 of the body 90, which causes the trailer kingpin to seek the center of the body 90 as it is further lowered toward car 10 to the position of FIGURE 7. After the trailer is lowered onto the car, the latch device 54 is secured to the kingpin as already described.

When the stand 50 is not in use, the components of latch device 54 are assembled in their kingpin engaging positions to secure them to the stand.

FIGURES 8 and 9 illustrate diagrammatically a modified form of stand 50a adapted for securement to a car 168 (see FIGURE 11) having the long travel cushioning characteristics described in said Peterson application Serial No. 856,963. Stand 50a employs a kingpin latching device 54a that is similar to that of FIGURES 6 and 7, but is arranged in association with a different form of strut structure 150. The strut structure 150 comprises a vertical strut 152 pivotally secured to the deck 154 by pins 156 secured in appropriate lugs 158. The vertical strut 152 moves from a horizontally disposed lowered retracted position indicated at the right hand side of FIGURE 11 to the upright extended position indicated by the left hand side of FIGURE 11, and is held in the latter position by prop forming struts 160, which are secured to the vertical strut by appropriate pins 162.

The kingpin latch device 54a is essentially the same as that previously described as indicated by corresponding reference numerals.

If desired, the prop structure 150 may be fixed to a rack or carriage 12, or directly to the bed of a car 168 having the aforementioned long travel cushioning characteristics; however, the prop structure 56 of FIGURES 1–7 is preferred for this purpose because of its simplicity and adjustability.

Stand 50a is designed primarily for use in connection with the crane loading procedures of mounting trailers on flatcars since it is contemplated that the specific embodiment of stand 50a shown will not permit adjustment longitudinally or laterally of the car after it has been secured in the position of FIGURE 8.

FIGURE 10 illustrates stand 50 secured directly to a flatcar 170, which may be a cushion underframe car of the type that provides the lading protection described in said Peterson application Serial No. 856,963.

*Specific Description*

The details of rack or carriage 12 and the manner in which it is associated with car 10 are specifically disclosed in said Gutridge application Serial No. 21,331 (the entire disclosure of which is hereby incorporated herein by this reference), reference to which may be had for a complete understanding of the details of the invention of that application (it may be added that the stand of this application is that shown in said Gutridge application).

The container 40 and chassis 42 illustrated in FIGURE 1 are of the type described in Gutridge application Serial No. 699,759, filed November 29, 1957, now Patent No. 3,070,041, granted December 25, 1962, as the container body 40 is separably connected to chassis 42 and has a kingpin 58 affixed to its undersurface 180. However, for purposes of our present invention, the chassis and container body may be of any suitable type providing for a kingpin 58 and bracket structures 34 applied to the chassis longitudinal frame members 44 to have the spacing already described. Conventional trailers normally have kingpin 58 affixed to the chassis (as is well known in the art) and trailer 52 of FIGURE 2A is intended to represent an arrangement of this type. The landing gear 122 illustrated is intended to represent any conventional form of retractable landing gear, with which most trailers are equipped.

The container body 40 as well as trailer 52 is preferably provided with suitable retractable eyes 182 at the corners of the respective containers for crane lifting purposes.

The cross members 120 of rack or carriage 12 with which the stands 50 are associated (and which are shown in block diagram form in FIGURE 1) may be of any suitable type, such as those forms shown in FIGURES 3–7. Thus, the cross members to which the universal joint assemblies 66, 67 and 68 are secured may be suitable angles 186 while the cross member on which the kingpin latching device 54 rests in its retracted position may be an elongate plate 188, which may be braced in any suitable manner if so desired. These members are secured in any suitable manner between the side sills 16 of the rack or carriage 12 and may be suitably formed where necessary to avoid interference with bracket assemblies 14.

The nature of the individual telescoping strut members 60, 61 and 65 is diagrammatically indicated in FIGURE 3 wherein it will be seen that the lower members 72 of each strut is affixed to a suitable stud 190 that is in turn affixed to a ball member 192 forming part of the respective ball and socket assemblies. The latter may be of any suitable type, though in the form illustrated, they comprise a base member 194 (see FIGURE 5) affixed to the respective cross members 120 in any suitable manner and formed with a spherically contoured recess 196 that is complementary to ball member 192. The ball member 192 of each strut is secured in place by a cap member 198 formed with a spherically contoured recess 200 which likewise is complementary to the spherical surface of ball member 192. Cap member 198 may be held in place by suitable screws (not shown) and is slotted as at 202 to permit the swinging movement of the respective struts indicated in FIGURE 4 as well as the lateral movement necessary to give the kingpin latch device 54 the adjustment range desired.

The upper strut members 70 are similarly arranged, they being affixed in any suitable manner to studs 204 having affixed at their respective ends ball members 206 which form a part of the respective ball and socket assemblies 62–64, and compression springs 205 (see FIGURE 3) may be applied between the respective lower members 72 and studs 204 of each telescoping strut member (60, 61 or 65) as suggested above in connection with the reference to said application Serial No. 797,989. The assemblies 62–64 are all essentially the same as will be observed from FIGURE 6, although the assemblies 62 and 63 are affixed sufficiently close to each other that they may be made one unit. Thus, the body member 90 of the kingpin latch device is formed with appropriately spaced spherically contoured concave recesses 210 to receive the ball members 206 of struts 60 and 61, and a common cap member 212, formed with appropriate spherically contoured concave surfaces 214 is received over ball members 206 and held in place by suitable bolts 216. Cap member 212 is slotted as at 218 to permit the necessary swinging movement of struts 60 and 61 as well as the lateral movement already mentioned.

At the other side of the body member 90, recess 220 is formed to receive ball member 206 of strut 65, which is held in place by cap member 222 (secured to body member 90 by suitable bolts 223) that is in turn formed with spherically contoured recess 224 to complement the spherical contour of the ball member; cap 222 is also formed with slot 226 to permit the necessary vertical and lateral swinging movement of strut 65.

The body member 90 has otherwise already been described in detail, though it may be pointed out that the openings or apertures 98 and 100 for receiving the prong members 102 and 104, respectively, of the locking device 106, are of different sizes, as will be observed from FIGURE 6. As the prong members 102 are positioned with respect to the car 10 to be in direct line with longitudinal impacts applied to the car, they are made somewhat thicker than the prong members 100 to give the additional strength desired, and the apertures 98 and 100 are of course shaped to complement the shape of prong members 102 and 104. Prong members 102 and 104 are curved as at 230 and 232, respectively, to complement the external curvature of the kingpin 58 (see FIGURE 6).

It may be added that kingpins 58 are all essentially of the same diameter and configuration by regulations dealing with the trucking industry and piggyback practices.

Figure 7A:
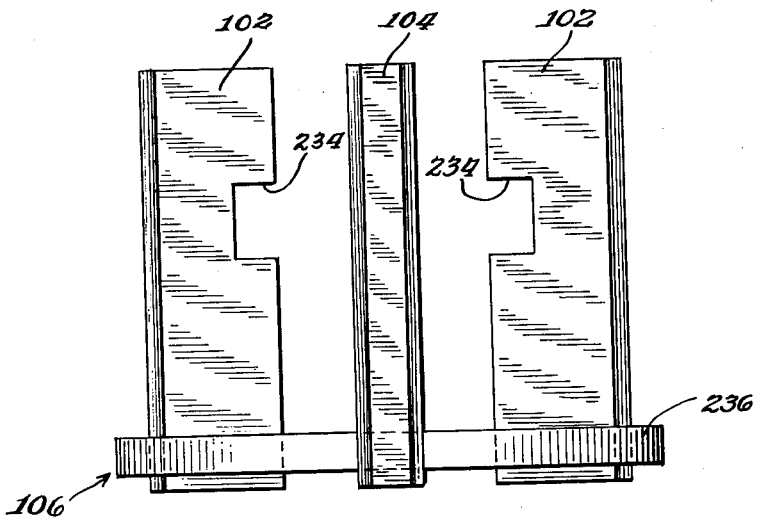
FIGURE 7A is a side elevational view of the pronged locking device shown in FIGURE 6A.

As seen in FIGURE 7A, the prong members 102 are slotted as at 234 to receive the keying arms 114 of U-shaped latch member 112. The prong members 102 and 104 are affixed together in any suitable manner to form the unitary device 106, as by being welded to disc-shaped element 236.

Referring now to the embodiment of FIGURES 8 and 9, the vertical strut member 152 may have any specific structural configuration deemed necessary or desirable, though in the form illustrated it is of I section defining web 239 and flange members 240, which at like ends 242 are perforated for receiving pins 156 that pivotally secure the vertical strut between the spaced pairs of lugs 158. The flanges 240 at their other ends are formed with suitable perforations to receive the respective pins 162, and pins 162 may be permanently affixed to the vertical strut by appropriate chains 244.

The vertical strut across its end portion 246 carries a fifth wheel plate structure 248 that has formed therein a kingpin seat 92a which is similar in configuration to kingpin seat 92. Thus, the top plate structure 248 is provided with conical surface 94, openings or apertures 98 and 100 for receiving the prong members 102 and 104 of a latch or locking device 106 (the latter being shown in outline in FIGURE 8). The top plate structure 248 is also formed with apertures 110 to receive spaced latching elements 250 (see FIGURE 9) that serve the function of latch member 112 of FIGURE 6. In the form shown in FIGURE 8, the latching elements 250 are slidably mounted in apertures 110 on either side of vertical strut web 239 and are actuated by the linkage generally indicated at 252 including a handle 254 affixed to lever 256 pivoted to the vertical strut structure as at 258 and pivotally secured to a rod member 260 that is affixed to both of the latch elements 250 and operates in an opening 261 formed in web 239. By swinging lever 256 so that its upper end moves in the direction of the arrow 263, the latch elements 250 will pass along apertures 110 of plate structure 248 and through the apertures or recesses 234 of prong members 102 and 104 when they are positioned about a kingpin 58 received in kingpin pocket or seat 92a. Lever member 256 is proportioned so that it will not entirely withdraw latch elements 250 from apertures 110 when elements 250 are retracted from latch device 106, because of interference with the adjacent flange member 240.

Handle 254 of lever 256 preferably extends through operating slot 265 formed in web 239 so that lever 256 may be grasped from both sides of web 239. An appropriate locking pawl 267 may be pivoted to web 239 as at 269 and formed with appropriate notches 271 to receive handle 254 to lock the lever 256 in either of its extreme positions of adjustment.

In the embodiment of FIGURE 8, the latch device 106 is received in a recess 262 formed in the vertical strut and it is held in this recess by the depending walls 268 of top wall structure 248.

Prop forming struts 160 may be of any suitable type, though in the form illustrated they are pivoted to deck lugs 270 by pins 272 and are provided with clevises 274 that removably receive pins 162.

The embodiment of FIGURES 8 and 9 is provided mainly to illustrate that the kingpin latching device of this invention may be operatively associated with supporting struts or props other than the form shown in FIGURES 1–7.

As already mentioned in connection with FIGURE 10, stands 50 may be secured directly to the car bed, as by affixing the ball and socket assemblies 66, 67 and 68 directly to the car somewhat in the manner indicated. Of course, the individual stands 50 should be secured to the car 170 so that in their lower retracted positions, a trailer may be end loaded onto the car in accordance with standard piggyback practice. Stand 50 in its retracted position rests directly on the car bed.

The arrangement of FIGURE 10 is also adapted for the loading of trailers by backing them over the side of the car.

Distinguishing Characteristics of the Invention

It will thus be seen that we have provided a fifth wheel stand which provides the ultimate in simplicity and maneuverability.

The simplicity of the stand of FIGURES 1–7 is the result of the practice of the invention described in said Peterson application Serial No. 856,963. It has been found that the long travel cushioning contemplated by said Peterson application Serial No. 856,963 reduces to a minimum any stresses applied to the fifth wheel stand as a result of coupler impacts, which permits a substantial reduction in the massiveness of the stand support structures thus permitting the use of a skeletonized prop structure shown in FIGURES 1–7.

One of the most important features of the stand of FIGURES 1–7 is its versatility of use in connection with car crane loading, or end or side loading, procedures, even though it is specifically arranged for crane loading operations by virtue of tapered surface 94. Thus, the same stand may be employed regardless of the loading and unloading facilities provided at a particular yard. Since no mechanical or power operated jack devices are required to lift the stand or move it between its retracted and extended positions, our stand will materially extend the usefulness of the piggyback handling system since it permits loading and unloading of trailers at intermediate points.

Another important feature of the invention of FIGURES 1–7 is that the stand itself provides a reasonable spotting tolerance for the trailer, since the ball and socket joint assemblies involved permit a limited amount of movement of the kingpin latch device longitudinally and laterally of the car (in a specific embodiment of the invention the tolerance is about six inches longitudinally and laterally of the car). This is to be distinguished from conventional stands which have a fixed path of movement between retracted and elevated positions and are designed to effect the proper centering action on the trailer kingpin by bodily moving the trailer.

Furthermore, the stand of the embodiment of FIGURES 1–7 is readily adapted for use with a wide variety of trailer heights since the individual struts of the stand may be locked in a wide variety of positions of adjustments.

The latch devices 54 and 54a are simple and effective, and require a minimum of maintenance because of the few moving parts involved and the permissible ruggedness of each component. Furthermore, the pronged locking device of kingpin latch devices 54 and 54a permits the application of thrusts to the kingpin in shear, as distinguished from bending stress, even though the tapered guide surfaces 94 of these latch devices extend well below the familiar kingpin slot 116 (see FIGURE 7), when the devices 54 and 54a are operatively associated with the trailer kingpin 58. This in turn permits the latch devices in and of themselves to have a kingpin gathering range that is limited only by the outer or largest permissible diameter of surfaces 94.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:

1. A fifth wheel stand for securing a trailer body of the type having a depending kingpin defining a slotted lower end portion to a railroad car or the like by engaging the kingpin thereof, said stand comprising:

a kingpin latch device and a support therefor, said latch device comprising a fifth wheel member formed on its top to define a substantially planar upwardly facing fifth wheel surface and an upwardly facing kingpin seat recessed in said member, said support comprising retractable prop means to which said fifth wheel member is secured at one end thereof for retractably mounting said fifth wheel member in a kingpin engaging position wherein said fifth wheel surface is horizontally disposed, said prop means at the other end thereof being adapted to be secured to the car, said kingpin seat of said fifth wheel member opening at said fifth wheel surface and being in circumambient relation about a central axis that is substantially perpendicular to said surface, which axis is vertically disposed when said fifth wheel member is disposed in its said kingpin engaging position, with the outer rim portion of said seat being defined by a kingpin guide surface disposed in substantially circumambient relation about the central axis of said seat and that converges inwardly of said fifth wheel member towards said axis and downwardly from said fifth wheel member surface, said guide surface merging into a centrally disposed portion of said seat that is proportioned to receive the lower end of the trailer kingpin when said fifth wheel member is in its kingpin engaging position, and means for forming a compression stress connection between said fifth wheel member and the portion of the kingpin that projects through the space defined by said guide surface when the kingpin is received in said seat, said means comprising apertures formed in said fifth wheel member in spaced relation about said central axis and said centrally disposed portion of said seat, said apertures extending parallel to said central axis and opening at said guide surface about and adjacent to said centrally disposed portion of said seat, with the portions of said fifth wheel member that define said apertures each defining an elongate abutment surface facing said axis and extending parallel to said axis, said abutment surfaces extending upwardly through said fifth wheel member to substantially the level of said fifth wheel surface, and removable latch members proportioned to be received in said apertures, respectively, and to engage with the respective abutment surfaces of the respective apertures, said latch members each being proportioned to, when positioned in the respective apertures, project upwardly from the said aperture openings through said seat to substantially the level of said fifth wheel surface, said latch members each being further proportioned to substantially fill the space between the respective abutment surfaces and the kingpin when the latter is received in said seat and said latch members are respectively received in said apertures, said latch members thereby being proportioned to engage the kingpin portion that lies in substantial coplanar relation with said fifth wheel surface when the kingpin is received in said seat and said latch members are received in said apertures, respectively, and releasable latch bar means cooperating with said latch members, said fifth wheel body, and the kingpin slotted end portion for releasably holding said latch members in their respective apertures in their said abutment surface and kingpin engaging positions and for keying said fifth wheel member to the kingpin, said fifth wheel member being formed with an aperture extending therethrough generally crosswise of said central axis of said seat and in alignment with the position of the kingpin slot when the kingpin is disposed within said seat and in said seat centrally disposed portion, one of said latch members being formed with a recess that is aligned with said crosswise aperture when said latch members are in their abutment surface and kingpin engaging positions, said latch bar means comprising an elongate rigid member proportioned to extend into said crosswise aperture and through the kingpin slot and said one latch member recess when the kingpin is received in said seat and said latch members are received in said abutment surface forming apertures, respectively, and means for securing said latch members together.

2. A fifth wheel stand for securing a trailer body of the type having a depending kingpin defining a slotted lower end portion to a railroad car or the like by engaging the kingpin thereof, said stand comprising:

a kingpin latch device and a prop structure therefor, said latch device comprising a fifth wheel member formed on its top with a fifth wheel surface and an upwardly facing kingpin seat, said prop structure comprising retractable prop means to which said fifth wheel member is secured at one end thereof for retractably mounting said fifth wheel member in a kingpin engaging position wherein said fifth wheel surface is horizontally disposed, said prop means at the other end thereof being adapted to be secured to the car, said kingpin seat opening at said surface and being formed to define a generally rounded pocket proportioned to receive the kingpin and that is in circumambient relation about a central axis that is vertically disposed when said member is in its kingpin engaging position, said pocket including an inwardly converging kingpin guide surface that is arranged in circumambient relation about said central axis of said pocket for locating the kingpin centrally of said seat, said guide surface merging into a centrally disposed portion of said pocket that is proportioned to receive the lower end of the trailer kingpin when said fifth wheel member is in its kingpin engaging position, said fifth wheel member being further formed to define a plurality of apertures opening into said pocket about said central axis of said seat, said apertures extending parallel to said central axis and opening at said guide surface and adjacent said centrally disposed portion of said pocket, with the portions of said fifth wheel member that define said apertures each defining an abutment surface facing said axis and extending parallel to said axis and upwardly of said fifth wheel member to substantially the level of said fifth wheel surface, a prong member for each of said apertures and proportioned to be inserted in the respective apertures, said prong members being further proportioned to, when inserted in the respective apertures, substantially fill the space between the respective abutment surfaces and the kingpin when the latter is received in said centrally disposed portion of said pocket, said prong members being further proportioned to, when in said respective apertures and in their said kingpin engaging positions, engage along substantially the full length of the kingpin portion that lies within the space defined by said pocket and below said fifth wheel surface, and latch bar means for releasably keying said prong members and said kingpin to said fifth wheel member, said fifth wheel member being formed with a pair of apertures that extend generally crosswise of said central axis of said pocket, said crosswise apertures extending through said fifth wheel member in alignment with the position of the kingpin slot when the kingpin is disposed in said pocket centrally disposed portion in the kingpin engaging position of said fifth wheel member, said prong members including recessed portions that are aligned with said crosswise apertures when said prong members are in their kingpin engaging positions, said latch bar means comprising a pair of latch bars proportioned to be received in said crosswise apertures, respectively, and extend through said pocket, said crosswise apertures and said prong member recesses and key said recessed prong members and the kingpin to said fifth wheel member when the kingpin is received within said pocket and in said pocket centrally disposed portion in the kingpin engaging position of said fifth wheel member, means for making said prong members fixed with respect to each other, and means for releasably locking said latch bars against removal from their said keying positions.

3. A fifth wheel stand for securing a trailer body of the type having a depending kingpin defining a slotted lower end portion to a railroad car or the like, said stand comprising:

a kingpin latch device and a support therefor, said latch device comprising a fifth wheel member defining an upwardly facing fifth wheel surface and an upwardly facing kingpin seat opening at said surface, said support comprising retractable prop means to one end of which said fifth wheel member is secured for retractably mounting said fifth wheel member in a kingpin engaging position wherein said surface is horizontally disposed, with the other end of said prop means being adapted to be secured to the car, said kingpin seat including a conically shaped inwardly converging kingpin guide surface that is arranged in circumambient relation about a rounded, substantially planar floor surface proportioned to substantially complement the lower end of trailer kingpins when the fifth wheel member is in its kingpin engaging position with a trailer kingpin disposed in said seat, said guide surface and said floor surface having central axes substantially aligned and vertically disposed when said fifth wheel member is in its kingpin engaging position, said fifth wheel member being formed with an aperture extending crosswise of said central axes and positioned to one side thereof and for alignment with the indentation defined by the slotted end portion of the kingpin when the kingpin is received in said seat in the kingpin engaging position of said member, said fifth wheel member being formed with a plurality of spaced apertures arranged in spaced relation about said seat, said spaced apertures extending upwardly through said fifth wheel member to substantially the level of said fifth wheel surface and parallel to said axes and opening at said guide surface and adjacent said floor surface, with the portion of said fifth wheel member defining said spaced apertures each defining an abutment surface facing said axes and extending parallel to said axes and upwardly to substantially the level of said fifth wheel surface, a plurality of rigid locking members proportioned for reception in the respective abutment surface defining apertures, said locking members being proportioned for positioning in said seat, said locking members being respectively formed to engage the portion of the kingpin that lies between the level of said fifth wheel surface and said floor surface and substantially fill the space between said kingpin portion and the respective abutment surfaces when the kingpin and said members are received in said seat, means for securing said locking members together, at least one of said locking members being formed with a recess positioned in alignment with said crosswise aperture when said locking members are positioned in their said kingpin and abutment surface engaging positions, and a rigid key member proportioned to be received through and extend between said crosswise aperture, said locking member recess, and the kingpin indentation when the kingpin is received in said seat and said locking members are in their said kingpin and abutment surface engaging positions, whereby said locking members, the kingpin, and said fifth wheel member may be keyed together by said key member after said kingpin has been received in said seat and said locking members have been positioned in their said kingpin and abutment surface engaging positions.

References Cited in the file of this patent

UNITED STATES PATENTS

| | | |
|---|---|---|
| 1,934,841 | Capony | Nov. 14, 1933 |
| 2,036,344 | Manhall | Apr. 7, 1936 |
| 2,069,644 | Butterworth | Feb. 2, 1937 |
| 2,099,288 | Allen | Nov. 16, 1937 |
| 2,608,420 | Eck | Aug. 26, 1952 |
| 2,845,878 | Gutridge | Aug. 5, 1958 |
| 2,846,172 | Gutridge et al. | Aug. 5, 1958 |
| 2,903,267 | Nelson | Sept. 8, 1959 |
| 2,963,989 | Opsahl et al. | Dec. 13, 1960 |
| 2,967,492 | Keener | Jan. 10, 1961 |
| 2,973,174 | Stanwick et al. | Feb. 28, 1961 |